United States Patent

Weichart et al.

[11] Patent Number: 5,394,379
[45] Date of Patent: Feb. 28, 1995

[54] HYDROPHONE

[75] Inventors: Helmut Weichart, Hanover; Manfred Technau, Laatzen, both of Germany

[73] Assignee: Prakla-Seismos GmbH, Hanover, Germany

[21] Appl. No.: 101,975

[22] Filed: Aug. 4, 1993

[30] Foreign Application Priority Data

Aug. 11, 1992 [DE] Germany ............... 4226485

[51] Int. Cl.$^6$ ............................................. H04R 17/00
[52] U.S. Cl. ...................................... 367/163; 367/174; 367/20; 367/155; 310/337; 29/594
[58] Field of Search ............... 367/163, 174, 20, 154, 367/155; 310/337; 29/594

[56] References Cited

U.S. PATENT DOCUMENTS

| | | | |
|---|---|---|---|
| 3,832,762 | 9/1974 | Johnston et al. | 29/25.35 |
| 3,970,878 | 7/1976 | Berglund | 310/8.6 |
| 4,639,283 | 1/1987 | Nakamura | 181/167 |
| 4,841,192 | 6/1989 | Tetlie et al. | 310/337 |
| 5,003,285 | 3/1991 | Geil | 367/154 |

*Primary Examiner*—J. Woodrow Eldred
*Attorney, Agent, or Firm*—Walter C. Farley

[57] ABSTRACT

A hydrophone for a marine seismic streamer has a pressure sensor with outer membrane surfaces on which piezoelectric sensors (4, 5) are secured. The pressure sensor is formed from two spaced steel disks (1, 2) having recesses directed toward one another and which are laser-welded at the edges in a gas-tight manner. The pressure sensor is electrically insulated from its external environment by a synthetic resin coating, which may enclose the entire pressure sensor, including the connecting wires. A method of making the hydrophone is also disclosed. The hydrophone can be manufactured so as to be small in dimensions and weight, is mechanically sturdy and capable of withstanding overload, as well as being protected by the synthetic resin coating against short circuiting and corrosion.

19 Claims, 2 Drawing Sheets

HYDROPHONE

FIELD OF THE INVENTION

This invention relates to a hydrophone especially for use in a marine seismic streamer.

BACKGROUND OF THE INVENTION

In a marine seismic streamer, which may have a length of 2–3 km, as a rule a plurality of hydrophones are spaced from one another rather uniformly along the length of the streamer. The hydrophones are designed as pressure cells, the connecting lines of which are usually exposed. Since a streamer is normally filled with oil of very low conductivity, insulation of the connecting elements of the hydrophone is not necessary.

However, such a design of a streamer also has risks because, in the event of a leak of the streamer, seawater can penetrate into the interior thereof and thus neutralize the insulation. In such an event, the defective portion of the streamer cannot be used any longer from the electrical point of view. If the hydrophones and electrical connections are exposed to the seawater for a long time, corrosion occurs which causes the pertinent hydrophones to be useless. A streamer which is defective in such a manner must therefore be extensively repaired and rebuilt.

Hydrophones which are employed in the known streamers comprise essentially pressure cells each of which typically comprises two pot-like half shells which are directed toward one another and which are soldered to one another at the abutting edges. Sensor elements in the form of piezoelectric disks are normally fitted onto the insides of the cell surfaces, forming the pressure membranes. Electrical connections to the membranes are made by adhesive bonding. To compensate for acceleration influences, two sensors are in each instance connected oppositely from the electrical point of view.

In the manufacture of such pressure cells, the two cell halves are soldered to one another at the edge side by soft solder. The heat arising in this case leads to a situation in which no stable pressure level can be achieved within the cell, so that the air pressure prevailing in the interior of the pressure cell in the cooled condition varies greatly from hydrophone to hydrophone. For this reason, a hard soldering of the cell halves does not enter into consideration.

Marine seismic streamers are normally used at water depths of up to 30 m. These hydrophones exhibit a depth limitation which arises because at greater depths the mutually opposite piezoelectric sensors press against spacing bodies and lose their measuring capability as a result. Direct impact of the piezoelectric crystals is impermissible because such direct impact against microcrystalline structures easily destroys the piezoelectric crystals. Furthermore, edge-side releasing of the adhesive bond between membrane and piezoelectric sensor can take place, so that the rejection rate of the hydrophones increases exponentially upon sinking below a predetermined depth.

FR 2,122,675 discloses a hydrophone which has two membranes which are disposed parallel and spaced from one another. The spacing of the membranes from one another is established by annular reinforcements on the outer periphery. The membranes may be made of metal and have piezoelectric pressure transducer elements peripherally mounted.

DE 3,732,401 discloses a piezoelectric hydrophone which likewise exhibits transducer elements which are mounted on opposite membranes. In this case, the transducer elements are disposed on the inside of the membranes, which consist of stainless steel, and which are welded to the lateral parts by laser beam welding. In the interior of the hydrophone and on the outsides of the membranes, there are disposed mechanical overload protection elements, which limit the membrane deformation.

DE-OS 3,931,578 discloses a piezoelectric membrane hydrophone in which the piezoelectrically activatable foil is clamped into an insulating frame and is provided, on opposite surfaces, with electrodes which overlap one another in a partial region. On that side which is remote from the measurement object, the foil is covered over by an electrically insulating sealing compound layer, which also entirely surrounds the clamping frame.

It is also known to fit the piezoelectric sensors on the outside of the membranes and to coat them with a protective lacquer. In this case, the membranes are welded to one another at the edge sides. Such a hydrophone, which was disclosed in a paper presented at the 51st EAEG meeting by the company Prakla-Seismos, has not however to date entered into use, since the fundamental problems of the aforementioned nature could not be adequately controlled even with this type.

SUMMARY OF THE INVENTION

Accordingly, an object of the present invention is to provide a hydrophone of the last-mentioned type which is improved such that it permits, with a small structure, high mechanical strength, indestructibility at high ambient pressures and reliable protection against external influences, with improved membrane properties of the steel disks and deflectability of the membrane.

A hydrophone according to the invention is formed, in particular, from two disk-shaped steel disks each with a piezoelectric sensor. To improve the membrane properties of the steel disks and to achieve desired spacing of the steel disks from one another, the steel disks are formed in a pot-shaped manner prior to their welding; in this case, particularly in the edge region of the membrane a further annular shaping is undertaken with partial reduction of the membrane thickness. As a result of this, the deflectability of the membrane is improved. This edge-side welding of the steel disks to one another takes place by laser welding. The entire pressure sensor, including piezoelectric sensors and connecting lines, is covered over by an electrically non-conductive plastic material coating. The plastic material layer also insulates the connecting lines, so that the entire hydrophone is insulated against environmental influences. Accordingly, such a hydrophone can readily be used in polar liquids. In the event of intrusion of water into a streamer, the electrical characteristic values of the hydrophone remain unchanged. Preferably, ultraviolet (UV) curing is used to cure the plastic material layer in order not to cause any gradient progression of the curing. The UV-curable layer is preferably made of urethane methylacrylate or acrylic ester.

The welding of the edge regions by means of laser welding has the decisive advantage that heating in the interior of the pressure sensor during the welding is very small and yet extremely high mechanical stability can be achieved in comparison with soft soldering.

Preferably, the piezoelectric sensors are adhesively bonded onto the outsides of the steel disks by means of an adhesive layer, which is rendered conductive by the addition of silver powder to the adhesive. In the event of deflection of the steel disks due to static pressures, the tensioning of the piezoelectric crystals in the region of adhesive bonding takes place, while they are compressed as the result of being fitted on the inside of a pressure cell, so that external fitting of the piezoelectric sensors has considerable advantages as compared with an internal fitting.

Preferably, the plastic material layer is curable by means of UV radiation. It may be, for example, urethane methylacrylate or acrylic ester.

Preferably, the pressure sensors are received in annular holders which serve to secure the hydrophones within the streamers and protect the hydrophones against mechanical influences from the traction cable and other elements in the streamer.

Hydrophones according to the invention are manufactured by pressing and forming two planar steel disks so that each disk has an edge region and an offset central region forming a central recess. The steel disks are then positioned with the recesses facing each other and the disks are connected together at the abutting edges by laser welding. Piezoelectric sensors are adhesively bonded onto the outer surfaces of the central regions of the steel disks. These may be adhesively bonded prior to the welding or after the welding. Subsequently, the steel disks, including piezoelectric sensors and electrical connecting elements, are electrically sealed by means of a UV-curable plastic material layer.

Such a hydrophone is small in dimensions and weight, mechanically sturdy, to a large extent capable of withstanding overload and protected against short circuiting and corrosion. Furthermore, the hydrophone is sealed against high-pressure air, and complete insensitivity to polar liquids is achieved.

BRIEF DESCRIPTION OF THE DRAWINGS

The invention is explained in greater detail hereinafter with reference to an illustrative embodiment. In the drawings.

DESCRIPTION OF THE PREFERRED EMBODIMENTS

Figure 1:
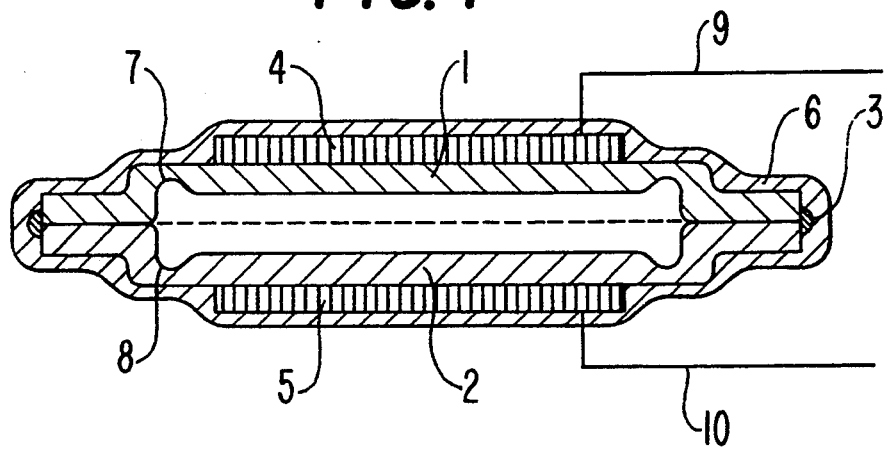
FIG. 1 is a side elevation in cross-section of a pressure sensor of a hydrophone according to the invention.

A pressure sensor of the type shown in FIG. 1 has two cap-shaped steel disks 1 and 2 each of which is formed with a central membrane region which is recessed relative to its edge so that when the disks are put together with the recesses facing each other as shown, the recesses form an interior cavity C. The edges of the steel disks abut each other directly and are connected to one another at their peripheries by a weld seam 3 produced by a laser beam. The welding is advantageously done on a rotary welding apparatus of a type which is known. This has the advantage that the heating of the steel disks occurs only at isolated points and on a very short term basis, so that almost no heating of the interior cavity occurs during the welding. As a result of the solder-free welding, the steel disks can furthermore rest directly on one another. The welding is extremely strong and the entire cell formed from the steel disks is accordingly capable of application even under high pressures.

Each disk has an annular thickness reduction 7, 8 at the outer periphery of its membrane region which permit improved deflectability of the membrane surfaces. One or two annular impressions are present, which are provided to facilitate formation of the cap-shaped disks, especially during a deep drawing process.

Either before the welding or following the welding, the steel disks are provided with piezoelectric crystals 4, 5, which are adhesively bonded onto the outer surfaces of the steel disks in the central membrane region. If it is desired to bond the piezoelectric crystals adhesively to the steel disks in an insulated fashion, an insulating adhesive must be used. However, it is preferred to use a conductive adhesive, the conductivity of which is created by the addition of silver powder to the adhesive, so that the poles of the piezoelectric crystals, which poles are directed towards the steel disks, have direct electrical contact with the steel disks. The outer surfaces of the piezoelectric crystals are provided with connecting electrical wires 9 and 10, respectively.

As a result of this structure of the pressure sensor, the piezoelectric disks are connected oppositely with respect to their directions of movement, so that acceleration signals which act in the same direction on both piezoelectric sensors cancel out. A precondition for this is the full symmetry of the structure of the pressure sensor.

The entire pressure sensor is subsequently encased with a highly insulating, electrically non-conductive synthetic resin coating 6, which preferably also includes insulation of the connecting wires 9, 10. As a result of this, all regions of the pressure sensor are electrically insulated with respect to the environment.

In order to achieve a high degree of uniformity of the plastic material layer, UV radiation is used for curing. This has the effect of preventing a situation in which a gradient progression is formed in the curing process, thus possibly creating non-uniformity in the coating. Preferably, the coating is made of a urethane methylacrylate or acrylic ester.

In the use of such a hydrophone, the flexing of the membranes is dependent upon the depth at which it is used under water. The spacing between the membranes of the steel disks 1, 2 is preferably set in such a manner that, at a water depth of approximately 30 m, the membrane inner surfaces touch one another, so that at greater depths no measurement signal can be picked off any longer from the piezoelectric receivers, since no further deflection of the membranes can be detected.

The inner spacing of the membranes is approximately 0.3 to 0.4 mm. The thickness of each piezoelectric disk is approximately 0.2 mm.

Figure 2:
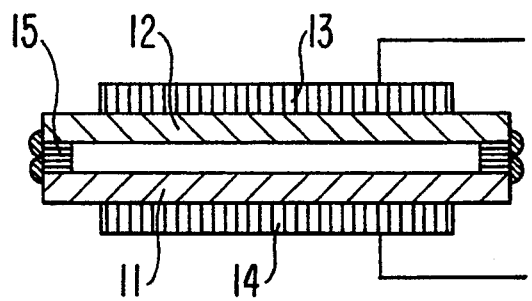
FIG. 2 is a simplified side elevation in cross-section of a further embodiment of a pressure sensor of a hydrophone in accordance with the invention.

FIG. 2 shows an alternative embodiment of a pressure sensor. In this embodiment, two planar steel disks 11, 12, are held at a spacing of approximately 0.5 mm from one another at their peripheral edges by a spacer ring 15. The steel disks 11, 12 can be shaped in cross-section in a manner similar to that in the embodiment of FIG. 1 as to the formation of annular thinned regions to permit flexing and movement of the central membrane region relative to the edges thereof, although this is not illustrated in FIG. 2. Piezoelectric crystals 13, 14 are adhesively bonded onto the outwardly surfaces of the steel disks. Disks 11 and 12 are welded to opposite sides of the spacer ring 15 by means of two annular weld seams. This embodiment has the advantage that a deep drawing process can be avoided so that further improvement in the symmetry of the pressure sensor is attainable.

Figure 3:
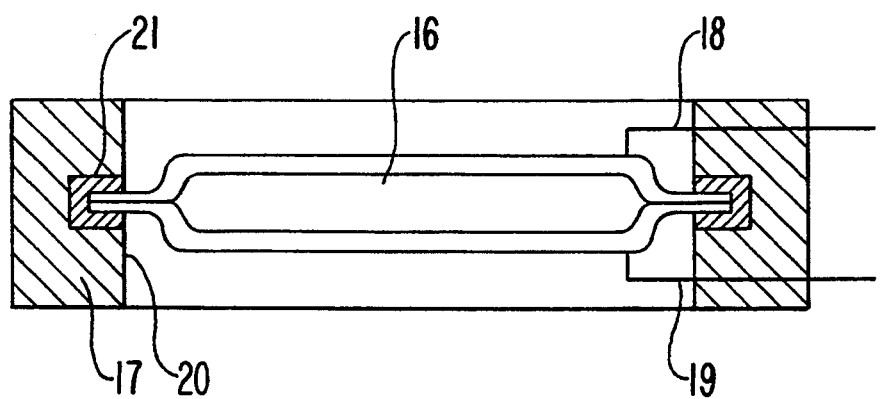
FIG. 3 is a schematic representation of a holder with a pressure sensor, which together form a hydrophone according to the invention.

FIG. 3 shows a pressure sensor according to FIG. 1 which is inserted into an annular holder 17. The holder has an annular internal groove 20 in which an elastic ring 21, preferably a rubber ring, is situated to receive the edge of pressure sensor 16. Connecting wires 18 and 19 are connected to pressure sensor 16 and pass through holder 17 which also performs the function of tension relief.

A plurality of hydrophones manufactured in this manner are secured along a streamer at equidistant intervals and switched in groups.

The impression of the annular thinned regions 7, 8 can take place during deep drawing of the steel disks or alternatively can be formed in a cutting operation. In cases in which the acceleration component cannot be balanced, the symmetry of the pressure sensor can be dispensed with, only one disk being then used as a membrane with a piezoelectric crystal.

In place of the use of stainless steel for the membrane, it is also possible to use a different metal with comparable electrical and mechanical properties.

What is claimed is:

1. A hydrophone for a marine seismic streamer comprising the combination of
   a pressure sensor including two steel disks (1, 2), each said disk having a central membrane portion and a peripheral attachment portion, said membrane portion lying in a plane parallel to and offset from a plane containing said attachment portion thereby forming a recess at one side of said disk, said membrane portion being flexible relative to said attachment portion and having an inner surface facing said recess and an outer surface, said disks being joined with said attachment portions contiguously abutting and said recesses facing each other to form a cavity between inner surfaces of said membrane portions;
   means for fixedly gas-tight sealing said attachment portions together;
   first and second piezoelectric sensors, one of said sensors being attached to an outer surface of each of said membrane portions, said inner surfaces of said membrane portions being free of sensors;
   means defining an annular recess forming a partial reduction of said membrane thickness around the periphery of said membrane portion;
   a protective layer of electrically non-conductive material entirely covering said sensor; and
   means for supporting said sensor.

2. A hydrophone according to claim 1 wherein said means for sealing comprises a laser weld around outer edges of said peripheral attachment portions.

3. A hydrophone according to claim 1 and further comprising electrically conductive adhesive layers bonding said piezoelectric sensors to said membrane portions, the conductivity of said adhesive layers being achieved by addition of silver powder to adhesive.

4. A hydrophone according to claim 1 and further comprising electrically conductive adhesive layers bonding said piezoelectric sensors to said steel disks, the conductivity of said adhesive layers being achieved by addition of silver powder to adhesive.

5. A hydrophone according to claim 1 wherein said protective layer of material covering said sensor is selected to be curable by ultra-violet radiation.

6. A hydrophone according to claim 5 wherein said protective layer is selected from the group including urethane methylacrylate or acrylic ester.

7. A hydrophone according to claim 6 wherein said means for supporting said pressure sensor comprises an annular holder (17) engaging said attachment portion of said sensor whereby a plurality of said hydrophones can be inserted mutually spaced apart in a marine seismic streamer.

8. A hydrophone according to claim 1 wherein said means for supporting said pressure sensor comprises an annular holder (17) engaging said attachment portion of said sensor whereby a plurality of said hydrophones can be inserted mutually spaced apart in a marine seismic streamer.

9. A hydrophone according to claim 8 and further comprising electrical conductors (18, 19) connected to said first and second piezoelectric sensors, said conductors passing through said annular holder.

10. A hydrophone according to claim 1 and further comprising electrical conductors (18, 19) connected to said first and second piezoelectric sensors.

11. A pressure sensor for use in a marine seismic hydrophone comprising
    two steel disks (1, 2), each said disk having a central membrane portion and a peripheral attachment portion, said membrane portion lying in a plane parallel to and offset from a plane containing said attachment portion thereby forming a recess at one side of said disk, said membrane portion being flexible relative to said attachment portion and having an inner surface facing said recess and an outer surface, said disks being joined with said attachment portions contiguously abutting and said recesses facing each other to form a cavity between inner surfaces of said membrane portions;
    means defining an annular recess forming a partial reduction of said membrane thickness around the periphery of said membrane portion;
    means for fixedly gas-tight sealing said attachment portions together;
    first and second piezoelectric sensors, one of said sensors being attached to an outer surface of each of said membrane portions, said inner surfaces being free of any sensors; and
    a protective layer of electrically non-conductive material entirely covering said sensor.

12. A hydrophone according to claim 11 wherein said means for sealing comprises a laser weld around outer edges of said peripheral attachment portions.

13. A pressure sensor for use in a marine seismic hydrophone for a marine seismic streamer comprising the combination of
    a pressure sensor including two steel disks (1, 2), each said disk having a central membrane portion and a peripheral attachment portion, said membrane portion being flexible relative to said attachment portion and having an inner surface and an outer surface;
    an annular joining ring having a diameter substantially equal to said attachment portion;
    means for fixedly and gas-tight joining said attachment portions of said disks to opposite sides of said ring with said inner surfaces facing each other and with said ring between said attachment portions, thereby defining a cavity between said inner surfaces of said membrane portions;

means defining an annular recess forming a partial reduction of said membrane thickness around the periphery of said membrane portion;

first and second piezoelectric sensors, one of said sensors being attached to an outer surface of each of said membrane portions, said inner surfaces being free of sensors; and a protective layer of electrically non-conductive material entirely covering said sensors, said pressure sensor having no separate means for limiting the motion of said membrane portions.

14. A pressure sensor according to claim 13 and further comprising electrically conductive adhesive layers bonding said piezoelectric sensors to said membrane portions, the conductivity of said adhesive layers being achieved by addition of silver powder to adhesive.

15. A pressure sensor according to claim 13 and further comprising electrically conductive adhesive layers bonding said piezoelectric sensors to said steel disks, the conductivity of said adhesive layers being achieved by addition of silver powder to adhesive.

16. A pressure sensor according to claim 13 wherein said protective layer of material covering said sensor is selected to be curable by ultra-violet radiation.

17. A pressure sensor according to claim 16 wherein said protective layer is selected from the group including urethane methylacrylate or acrylic ester.

18. A method of making a hydrophone comprising the steps of forming first and second steel disks each having a central portion and a peripheral edge portion, forming an annular recess which reduces the central portion thickness around the periphery of said central portion, positioning the disks against each other with the peripheral edge portions against each other, laser-welding the edge portions together, adhesively bonding piezoelectric sensors only to outside surfaces of the central portions of the disks, and coating the disks and sensors with a layer of an ultraviolet-curable plastic material.

19. A method according to claim 18 wherein the curable material is urethane methacrylate or acrylic ester.

* * * * *